United States Patent [19]

Bonn

[11] 3,964,890
[45] June 22, 1976

[54] RECHARGEABLE PARTICULATE FILTER FOR RADIOACTIVE CONTAMINATED GAS STREAMS

[75] Inventor: John William Bonn, Columbus, Ohio

[73] Assignee: CVI Corporation, Columbus, Ohio

[22] Filed: June 3, 1974

[21] Appl. No.: 475,477

[52] U.S. Cl. .................................. 55/479; 55/428; 55/484; 55/518
[51] Int. Cl.² ........................................ B01D 46/30
[58] Field of Search ............ 55/387, 389, 484, 479, 55/512, 468, 428, 518

[56] References Cited
UNITED STATES PATENTS

| | | |
|---|---|---|
| 3,747,308 | 7/1973 | Versluis et al. ....................... 55/387 |
| 3,815,335 | 6/1974 | Barneky .............................. 55/484 |
| 3,873,287 | 3/1975 | Barnebey ............................. 55/387 |
| 3,881,899 | 5/1975 | Spulgis ............................... 55/387 |

*Primary Examiner*—Bernard Nozick
*Attorney, Agent, or Firm*—Charles N. Quinn

[57] ABSTRACT

System includes a closed housing having a plurality of rectangularly configured beds with perforate sidewalls longitudinally disposed in housing in laterally spaced disposition with each other. Alternate spaces at inlet end are closed and alternate spaces opposite the open ends are closed at exit end whereby contaminated gas is laterally squeezed through the beds filled with particulate adsorbent. The lower portions of the beds funnel into longitudinally extending discharge chutes enclosed within respective wells, the lower edges of the chutes rising at a constant angle above the well floor. An evacuation system coupled to the wells suctions the pile of particulate from the most remote portion of the chutes first.

3 Claims, 7 Drawing Figures

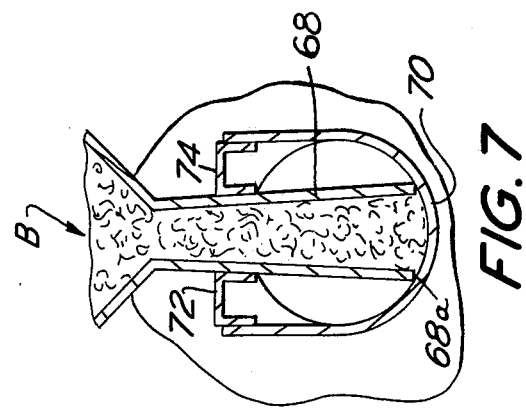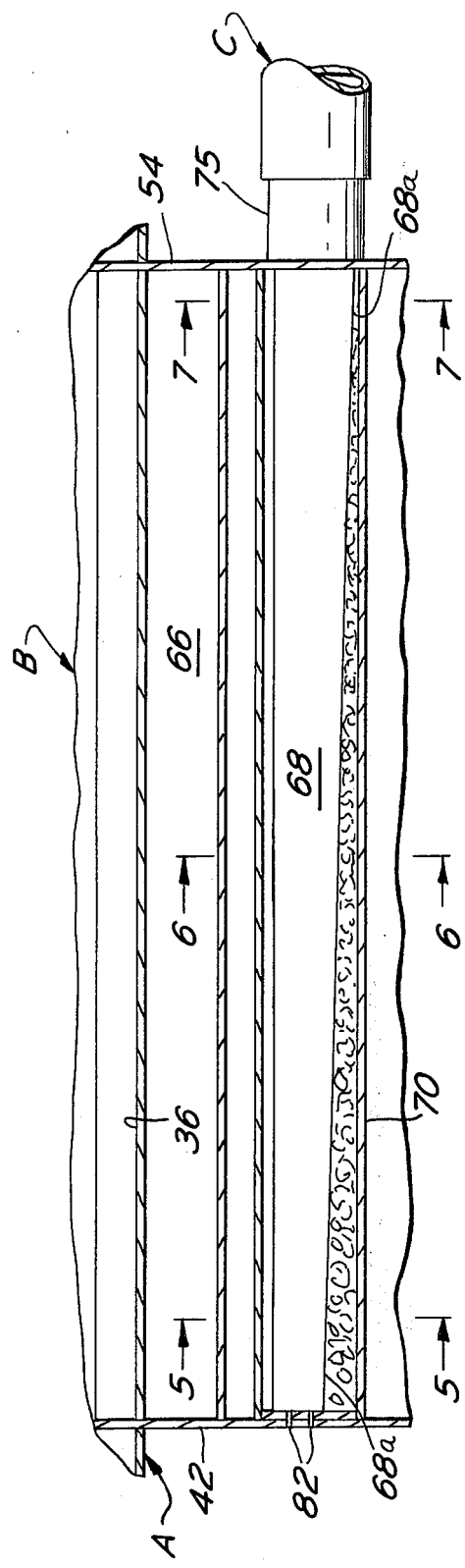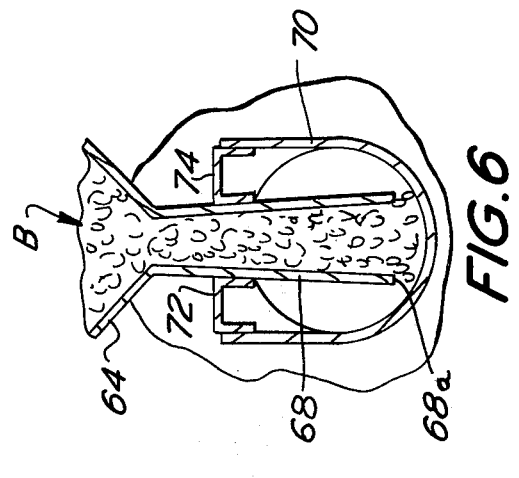

RECHARGEABLE PARTICULATE FILTER FOR RADIOACTIVE CONTAMINATED GAS STREAMS

This invention relates to a rechargeable particulate filter for adsorption of radioactive contamination from a nuclear containment structure in the event of a nuclear power plant design basis or loss of coolant accident. More particularly, this invention relates to a rechargeable charcoal filter which permits loading and unloading of the particulate granules while limiting exposure of personnel to radioactivity. The present invention could also be utilized in heating and air conditioning systems.

In prior patent application Ser. No. 317,434, filed Dec. 21, 1972, there is shown and described a rechargeable particulate filter for adsorption of radioactive contamination wherein a plurality of filter beds of substantially octagonal configuration are transversely arranged in spaced disposition with each other in a housing. Each filter bed includes parallel spaced perforate outer walls and parallel spaced perforate inner walls defining an annulus therebetween for holding charcoal therein in the manner of an individual cage. The contaminated gas stream enters from a manifold through an inlet contained between the inner perforate walls, squeezes laterally through the charcoal cage into the spaces between adjacent beds and thence is drawn into an exhaust manifold for discharging the cleansed gas. The charcoal is loaded into the beds through hoppers at the top and withdrawn pneumatically through a closed loop which sweeps up the charcoal that piles up after falling through a funnelling spout at the bottom of the beds into an encapsulating well. The beds themselves are individual units of a particular size, and the housing is built around the prefabricated beds.

The present invention employs a plurality of substantially rectangular parallelopiped filter beds which include spaced perforate walls defining a chamber for receiving particulate adsorptive material. As in the prior application, a hopper at the upper portion of the chamber permits loading of the beds while pneumatic evacuation means at the lower portion of the chambers allows the particulate material to be drained when the adsorptive capacity of the charcoal is expended. Each filter bed is so constructed and arranged that alternate spaces between successive beds are closed adjacent the inlet end and alternate spaces opposite the inlet spaces are closed to define a plurality of inlet channels through which contaminated gas is submerged on each side within a rectangular cage of particulate material and is squeezed laterally through adjacent filter beds into exit channels leading to a discharge manifold. Each bed being of full rectangular configuration on each side of the respective inlet and outlet channels presents maximum area through which the contaminated gas is filtered. The filter beds are loaded from the top and the particulate material falls by gravity into a longitudinally extending funnel downwardly projecting from the bottom of the rectangular filter bed. Each funnel terminates in a longitudinally extending downwardly diverging discharge chute which is encapsulated within a longitudinally extending well enclosing at least the lower portion of each discharge chute. The floor of each well is spaced below the lower edge of the discharge chutes whereby the chutes will plug when the angle of repose of the charcoal pile reaches the lower edge of the chutes, thus enabling the beds to be fully packed. A conduit extending from one end of the wells is adapted to be coupled to a blower and tank receptacle for collecting spent charcoal by suction.

In the present invention each of the discharge chutes longitudinally rises in a direction distal the conduit having the suction applied thereto to define a V-shaped plan configuration from one end to the other. Thus, as the evacuation means upon actuation of the blower pneumatically sweeps the particulate material from the pile, the particulate material falling from the packed beds tends to empty from the remote end of the V-shaped discharge chutes first such that radioactive contaminants are always retained in encapsulated disposition within a triangle adjacent the suction end and neverreleased into the environment, even during the evacuation procedure, until complete emptying of the bed has been effected. No short circuiting can occur.

It is therefore an object of this invention to provide a rechargeable particulate filter for adsorbing radioactive contaminants from a gas stream wherein a maximum adsorptive surface area is presented.

Another object of this invention is to provide a rechargeable particulate filter for adsorbing radioactive contaminants from a gas stream in which the number and size of the filter beds is designed with regard to the housing requirements.

Still another object of this invention is to provide a rechargeable particulate filter in which the contents thereof may be evacuated remotely and thereby limit exposure of personnel to radioactive contamination.

Other objects of this invention are to provide an improved device of the character described which is easily and economically produced, sturdy in construction and both highly efficient and effective in operation.

With the above and related objects in view, this invention consists of the details of construction and combination of parts as will be more fully understood from the following detailed description when read in conjunction with the accompanying drawings in which:

FIG. 4 is a sectional view taken along lines 4—4 of FIG. 2.

FIG. 5 is a sectional view taken along lines 5—5 of FIG. 4.

FIG. 6 is a sectional view taken along lines 6—6 of FIG. 4.

FIG. 7 is a sectional view taken along lines 7—7 of FIG. 4.

Figure 1:
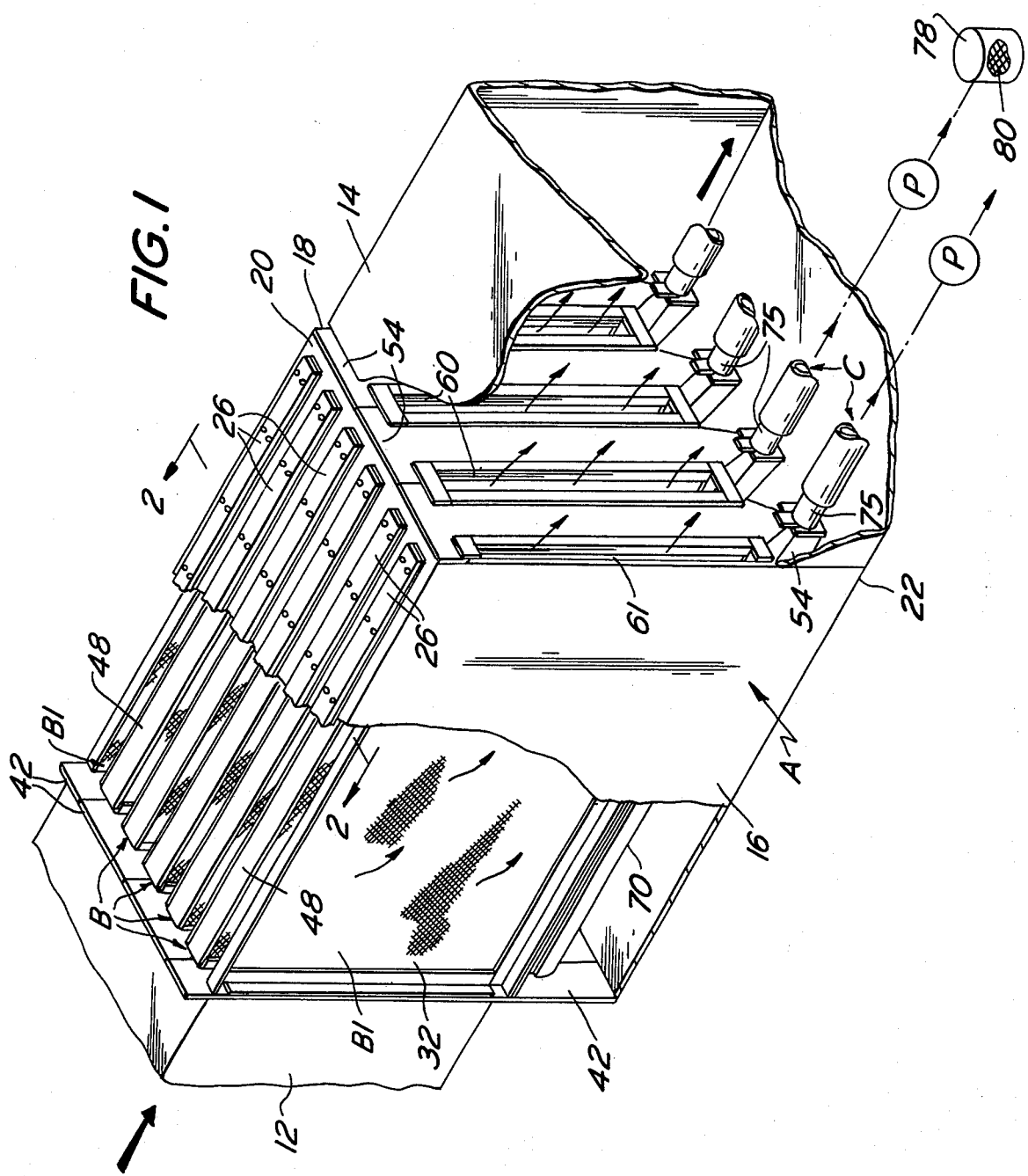
FIG. 1 is a perspective view, and partly broken away, of a rechargeable particulate filter embodying this invention for removal of radioactive contamination in a gas stream.

Referring now in greater detail to the drawings in which similar reference characters refer to similar parts, there is shown a rechargeable particulate filter for adsorbing radioactive contaminants from air or gas streams drawn from the containment structures of nuclear reactors in the event of a design basis or loss of coolant accident. The filter includes an outer housing A having an inlet end coupled to the containment vessel (not shown), a plurality of filter beds B for holding particulate material, such as activated charcoal, to adsorb the radioactive contamination, primarily isotopes of iodine and methyliodide, and evacuation means C for emptying the filter beds of their particulate content when the latter is spent.

Referring to FIG. 1, the housing A is of generally rectangular welded steel construction to provide gas-tight design and includes an inlet end 12 which is coupled to the nuclear containment vessel (not shown) or the like, and an exhaust end 14 which is coupled to a blower (not shown) for venting the cleansed air to the atmosphere after passing through the filter beds B. A typical overall train for use as a standby gas treatment system is shown in prior patent application, Ser. No. 317,434, filed Dec. 21, 1972 by Thomas Nelson Hickey and Ivars Sigurds Spulgis. The present housing A includes solid side walls 16 and 18 of sheet metal construction, a top wall 20 and a bottom wall 22. The top wall 20 has a plurality of rectangular ports 24 situated directly above respective filter beds B, the ports acting as hoppers for filling the beds. A cover plate 26 having margins overlying the periphery of the ports 24 is secured about each port 24 by bolts 28 to define closures for the filter beds B during standby or operation.

Figure 2:
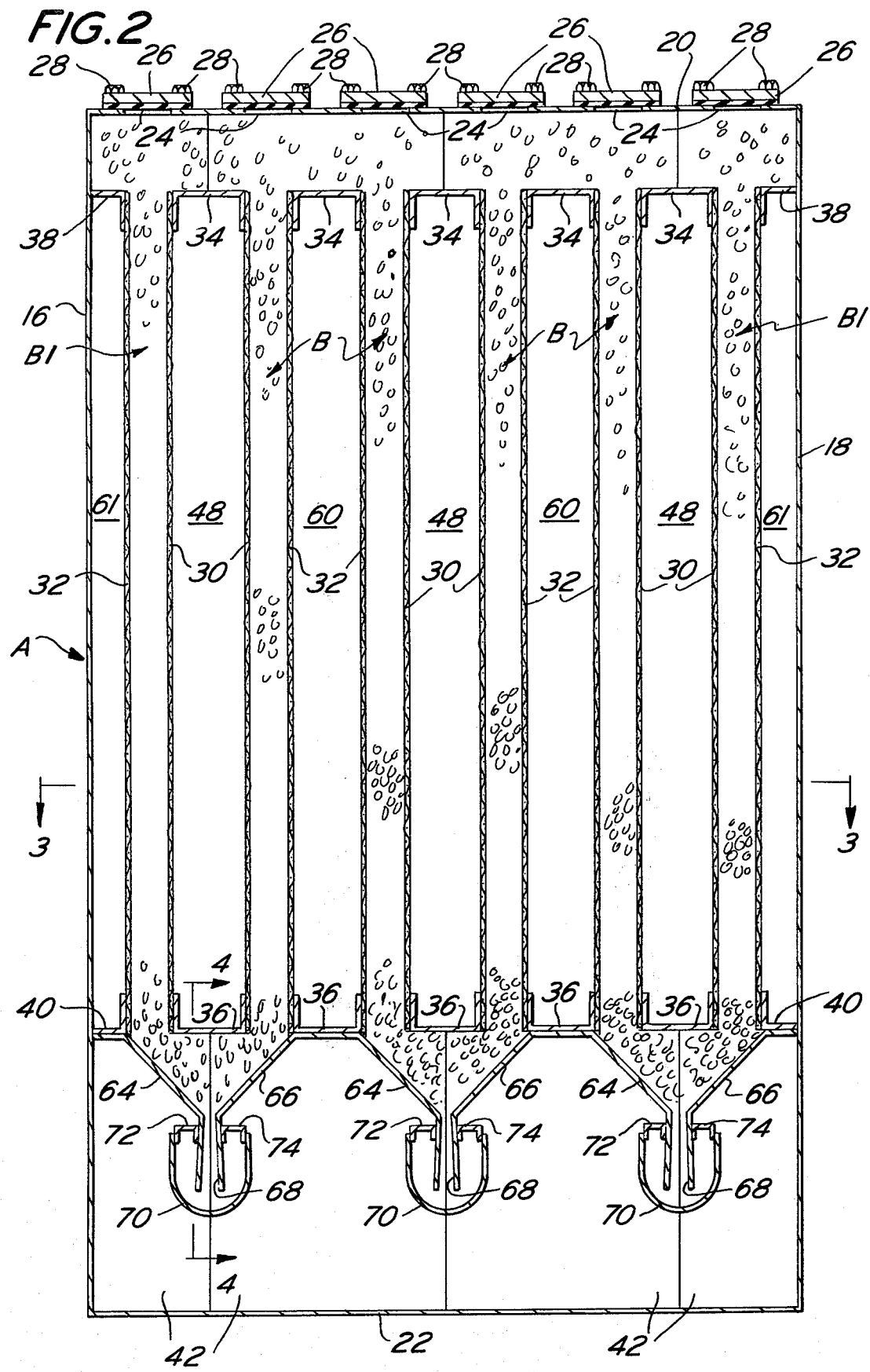
FIG. 2 is a sectional view taken along lines 2—2 of FIG. 1.
Figure 3:
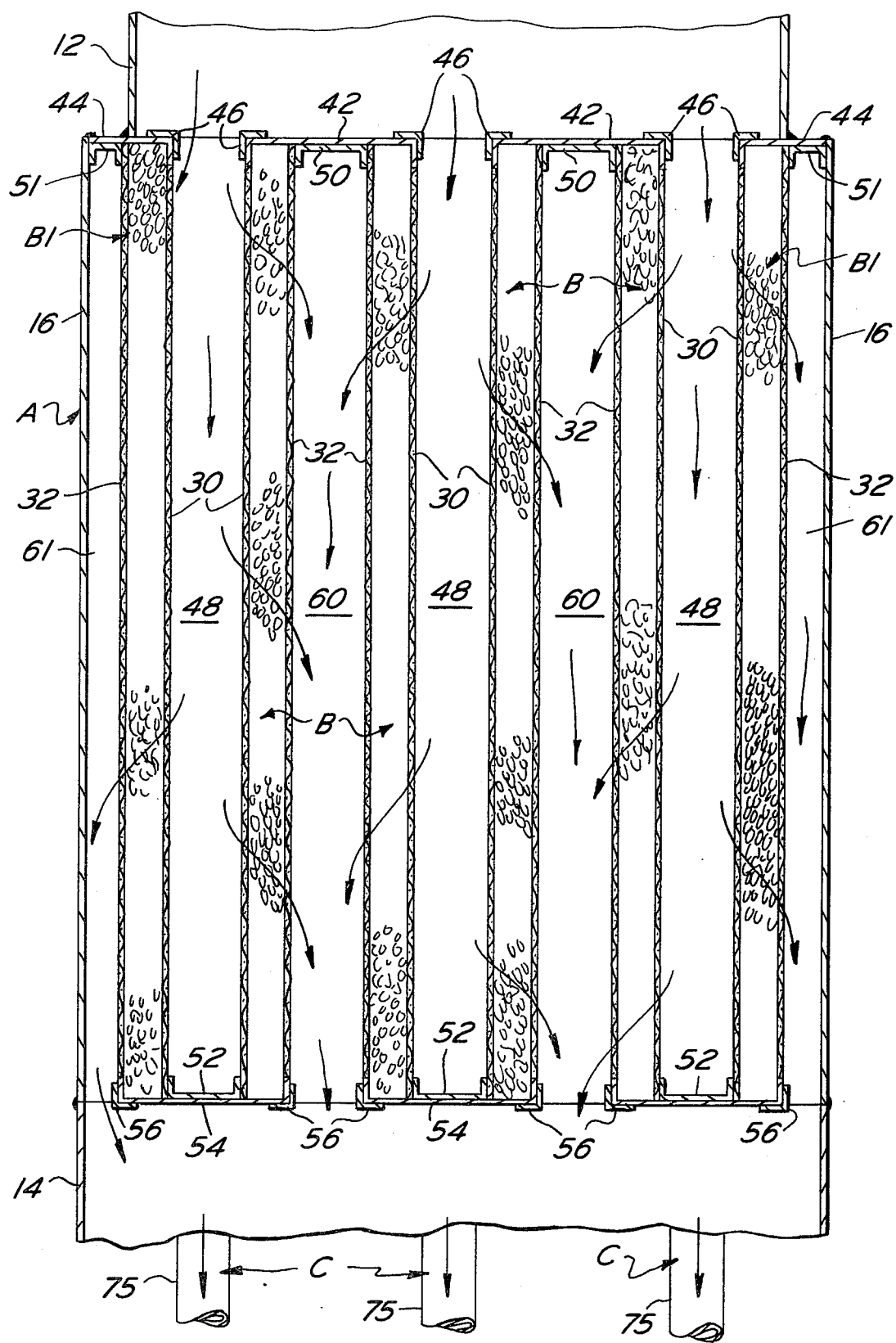
FIG. 3 is a sectional view taken along lines 3—3 of FIG. 2.

Referring to FIGS. 1, 2 and 3, the filter beds B are of generally rectangular parallelopiped configuration, and each includes opposed perforate side walls 30 and 32 which are spaced from each other to define a chamber for holding the charcoal particulate. As shown in FIG. 2, adjacent beds B are laterally spaced from each other by welded upper and lower channels 34 and 36, the end beds being spaced from the side walls 16 and 18 of the housing A by upper and lower L-shaped angle members 38 and 40. As shown in FIGS. 1 and 3, adjacent spaced beds B are closed adjacent the inlet end by plates 42 which extend vertically from the top 20 to the bottom 22. The outermost beds B1 are enclosed at the inlet end by vertical plates 44. Vertically extending angle members 46 welded to the inlet ends of the beds B and the closure plates 42 and 44 frame the inlet spaces to define inlet channels 48 into which the radioactive contaminated gas stream enters. Channel members 50 are welded to the interior of the perforate walls 32 from top to bottom the legs of the channel members 50 projecting for an appreciable distance along the margins of the perforate walls 32 to prevent short circuiting of the gas stream through the ends of the charcoal beds. The angle members 46 and end channel members 51 perform a similar function. At the opposite end of the inlet channels 48, a vertically extending channel member 52 and vertically extending closure plates 54 define blind walls at the distal end of the beds B, the legs of channel members 52 and those vertically extending angle members 56 preventing short circuiting of the gas stream through the ends of the charcoal beds. The angle members 56 frame the spaces between adjacent beds B at the outlet end of the beds to define exhaust channels 60 and 61 through which the cleansed air is discharged into the exhaust duct 14.

As is apparent, the inlet air entering the inlet channels 48 is blocked at the blind walls 54 so as to squeeze the gas laterally through a predetermined thickness of charcoal for a predetermined residence time into the exhaust channels 60 and 61 at the opposite sides thereof. By appropriate selection of thickness of the charcoal beds, the beds may be built within a given cross-section of the housing A to obtain the desired residence time of the gas within the beds rather than to build individual charcoal cages and fit a housing thereabout.

The entire rectangular surfaces 30 and 32 of the beds B are available for distributing through the adsorption area.

Referring now to FIGS. 2, 4, 5, 6 and 7, it may be seen that the lower portion of adjacent filter beds B includes longitudinally extending inwardly-inclined funneling walls 64 and 66 which cause the particulate material to converge and thence fall through a discharge chute 68 at the lower end thereof. The walls of the discharge chutes 68 are divergent in the downward direction and the ends thereof are spaced from the bottom of a longitudinally extending well 70 which encapsulates the lower portion of the discharge chutes. The upper portion of the wells 70 includes a pair of inverted channel sections 72 and 74 which are welded to the exterior of the discharge chutes 68 while the floor of the wells 70 is spaced below the bottom of the discharge chutes 68. It is to be observed that the height of the lower edges of the discharge chutes 68 from the floor of the wells 70 rises in the direction of the inlet end of the housing A. That is, the edges of the discharge chutes 68 are closest to the floor of the wells 70 adjacent the vertical plates 54 and most widely spaced progressively from the well floor toward the vertical plates 42. See FIGS. 4, 5, 6 and 7. As the charcoal falls through the discharge chutes 68, it forms a pile or heap of particulate on the floor of the well 70 until the angle of repose of the pile closes at the lower edges of the chutes 68.

Attached to the plates 54 in line with each well 70 is a pipe 75 which is adapted to be coupled to a blower P and tank 78 containing a porous bag 80, the latter collecting the charcoal from the beds B and passing air through the interstices of the bag material. In line with the wells 70 within the vertical plates 42 are a plurality of small ports 82 or screen to permit air to be drawn through the wells 70 by the evacuation means C.

As apparent from the longitudinal rise of the discharge chutes 68 from the floor of the wells 70, when suction is applied to the pipes 75, the charcoal adjacent the wall 42 (most remote from the evacuation means C) will be emptied first. That is, a larger volume of charcoal will fall upon the floor of the well 70 and be swept up by the suction at a point most remote from that at which the suction is applied. As a consequence, a triangle of charcoal will remain adjacent the suction pipe 75 and become smaller and smaller until the charcoal bed B is completely emptied. As a consequence, the rise of the discharge chutes 68 prevents the suction from drawing just air alone and causing short circuiting so long as charcoal is available in the particular bed. The downward divergence of the chute walls 68 promotes great efficiency during the sweep emptying process.

When in normal standby or filter adsorption operation, the ends of the pipes 75 are capped, the evacuation means C only being coupled to one bed at a time to remove the "spent" charcoal therefrom. The present invention is also applicable for use in conventional heating and ar conditioning systems.

Although this invention has been described in considerable detail, such description is intended as being illustrative rather than limiting, since the invention may be variously embodied without departing from the spirit thereof, and the scope of the invention is to be determined as claimed.

What is claimed is:

1. In combination with a rechargeable gas filter of the type wherein a plurality of parallel laterally spaced vertically oriented generally parallelepiped filter beds are provided within a generally rectangular housing having a gas inlet and a gas outlet, wherein said beds each have two rectangular parallel vertical perforate walls for containing adsorbent material therebetween and having two vertical plates, one at the inlet side and the other at the outlet side, welded to said spaced perforate walls, two said vertical plates and two said perforate walls defining therein a single filter bed, said rectangular walls oriented with the sides of the rectangle vertical and horizontal, such that the bottom of the portion of the parallelepiped bed exposed to gas flow is flat and horizontal, and having vertically disposed channels welded between adjacent beds and between end beds and sides of said housing, alternately at the inlet and outlet, said vertical channels at the outlet defining gas inlet channels communicating with the inlet end of said housing and said vertical channels at the inlet thereby defining gas exhaust channels communicating with the outlet of the housing such that the spaces between adjacent filter beds alternately are inlet channels and exhaust channels whereby for gas to pass from an inlet channel to an exhaust channel gas must pass through the two spaced perforate parallel walls of a filter bed, wherein means connect said beds with one another and with said housing so that gas passing from said inlet to said outlet must pass laterally through said perforate walls of one bed and adsorbent material contained therein, the improved means for evacuating said filter of adsorbent material which comprises:

a. a pair of longitudinally extending inwardly inclined funneling walls extending from bottom margins of adjacent filter beds entirely along the longitudinal length thereof, each wall of said pair extending downwardly and inwardly from an outer perforate wall of one of the adjacent filter beds, said pair of funneling walls forming a downwardly diverging discharge chute remote from the filter beds extending the length of the filter beds, said discharge chute being of greater length at one end of said filter beds and of lesser length at an opposite end of said filter beds;

b. channel means laterally extending exterior of said discharge chute along the entire longitudinal length thereof;

c. a well extending longitudinally the length of said discharge chute thereby encapsulating said discharge chute, secured to said channel means;

d. a pipe extending in the longitudinal direction from the end of said well where said discharge chute is of greater length; and e. port means in the top of said housing for the introduction of adsorbent material to the filter therethrough;

whereby when said filter is filled with granular adsorbent through said port means, granular adsorbent from said adjacent filter beds above said funneling walls will fall through said discharge chute and form a heap on the portion of said well below said discharge chute along the entire longitudinal length thereof until the angle of repose of the heap of particulate granular adsorbent closes the discharge chute;

whereby when suction is applied to said pipe granular adsorbent in said well will be progressively drawn through said pipe, with granular adsorbent remote from said pipe in said well being drawn out first, such that all granular adsorbent in said adjacent filter beds above said funneling walls will be removed therefrom with the adsorbent in a corner of the parallelepiped most remote from the pipe being removed first.

2. The improved combination of claim 1 wherein said individual walls of said pair of funneling walls initially converge, from a throat and then diverge below said beds, said diverging portions forming said discharge chute, whereby when said filter is filled with granular adsorbent, granular adsorbent from said adjacent filter beds above said funneling walls will rest upon the converging portion of said funneling walls and will fill said throat and said discharge chute and form said heap on said well below said discharge chute along the entire longitudinal length thereof until the angle of repose of the heap of granular adsorbent closes space between a bottom outlet of said discharge chute and said well thereby closing said discharge chute;

whereby when said suction is applied to said pipe, granular adsorbent in said well which has closed said discharge chute will be progressively drawn through said pipe, granular adsorbent remote from said pipe being drawn out first, and granular adsorbent in said beds will progressively fall through said discharge chute progressively replacing adsorbent which has been withdrawn from said well until all adsorbent has been removed therefrom such that all adsorbent in said adjacent filter beds is removed with adsorbent in a first corner of each bed remote from said pipe being removed first and adsorbent in a second corner of each bed diagonally opposite said first corner portion and proximate said pipe being removed last.

3. The improved combination of claim 1 wherein said beds are oriented generally parallel to the direction of gas flow into and out of said filter, wherein said parallel vertical perforate walls are generally parallel to the direction of gas flow into and out of said filter such that each bed presents a rectangular surface with a flat, horizontal bottom for gas flow laterally therethrough, wherein at said converging portion of said funneling walls said funneling walls converge each along a straight line inclined from the horizontal at an angle in excess of the angle of repose of the adsorbent, said converging portions thereby forming a funnel-like trough parallel to and below said beds along the longitudinal length thereof, wherein said discharge chute decreases from greater length at one end of said filter beds to lesser length at an opposite end of said filter beds along a straight line, and wherein said well encapsulates but does not contact the outlet of said discharge chute.

* * * * *